United States Patent [19]
Canich et al.

[11] Patent Number: 5,516,848
[45] Date of Patent: May 14, 1996

[54] PROCESS TO PRODUCE THERMOPLASTIC ELASTOMERS

[75] Inventors: Jo Ann M. Canich, Houston; Henry W. Yang, Kingwood; Gary F. Licciardi, Humble, all of Tex.

[73] Assignee: Exxon Chemical Patents Inc., Wilmington, Del.

[21] Appl. No.: 381,171

[22] Filed: Jan. 31, 1995

[51] Int. Cl.$^6$ ..................................................... C08L 23/10
[52] U.S. Cl. ................................................ 525/240; 526/351
[58] Field of Search ............................................. 525/240

[56] References Cited

U.S. PATENT DOCUMENTS

| | | |
|---|---|---|
| 3,472,829 | 10/1969 | Claybaugh et al. . |
| 3,487,128 | 12/1969 | Okazaki et al. . |
| 4,335,225 | 6/1982 | Collette et al. . |
| 4,701,432 | 10/1987 | Welborn, Jr. . |
| 4,948,840 | 8/1990 | Berta . |
| 5,026,798 | 6/1991 | Canich . |
| 5,055,438 | 10/1991 | Canich . |
| 5,077,255 | 12/1991 | Welborn, Jr. . |
| 5,124,418 | 6/1992 | Welborn, Jr. . |
| 5,183,867 | 2/1993 | Welborn, Jr. . |
| 5,212,247 | 5/1993 | Asanuma et al. . |
| 5,280,074 | 1/1994 | Schreck et al. . |
| 5,322,902 | 6/1994 | Schreck et al. . |

FOREIGN PATENT DOCUMENTS

| | | |
|---|---|---|
| 310734 | 4/1989 | European Pat. Off. . |
| 455813 | 6/1991 | European Pat. Off. . |
| 475306 | 3/1992 | European Pat. Off. . |
| 527589 | 2/1993 | European Pat. Off. . |
| 584609 | 3/1994 | European Pat. Off. . |
| 604917 | 7/1994 | European Pat. Off. . |
| 93/13143 | 7/1993 | WIPO . |

OTHER PUBLICATIONS

Seymour et al—Advances in Polyolefins p. 363 1987—Plenum Press.
U.S. Patent Application USSN 08/159,888f; Nov. 30, 1993.
Rexene Sales Literature Jun. 1993.

*Primary Examiner*—Carman J. Seccuro, Jr.
*Attorney, Agent, or Firm*—Catherine L. Bell; Jaimes Sher

[57] ABSTRACT

This invention relates to polypropylene blends, particularly blends of high molecular weight amorphous polypropylene with lower molecular weight isotactic polypropylene. These blends exhibit unusual elastomeric properties.

12 Claims, 1 Drawing Sheet

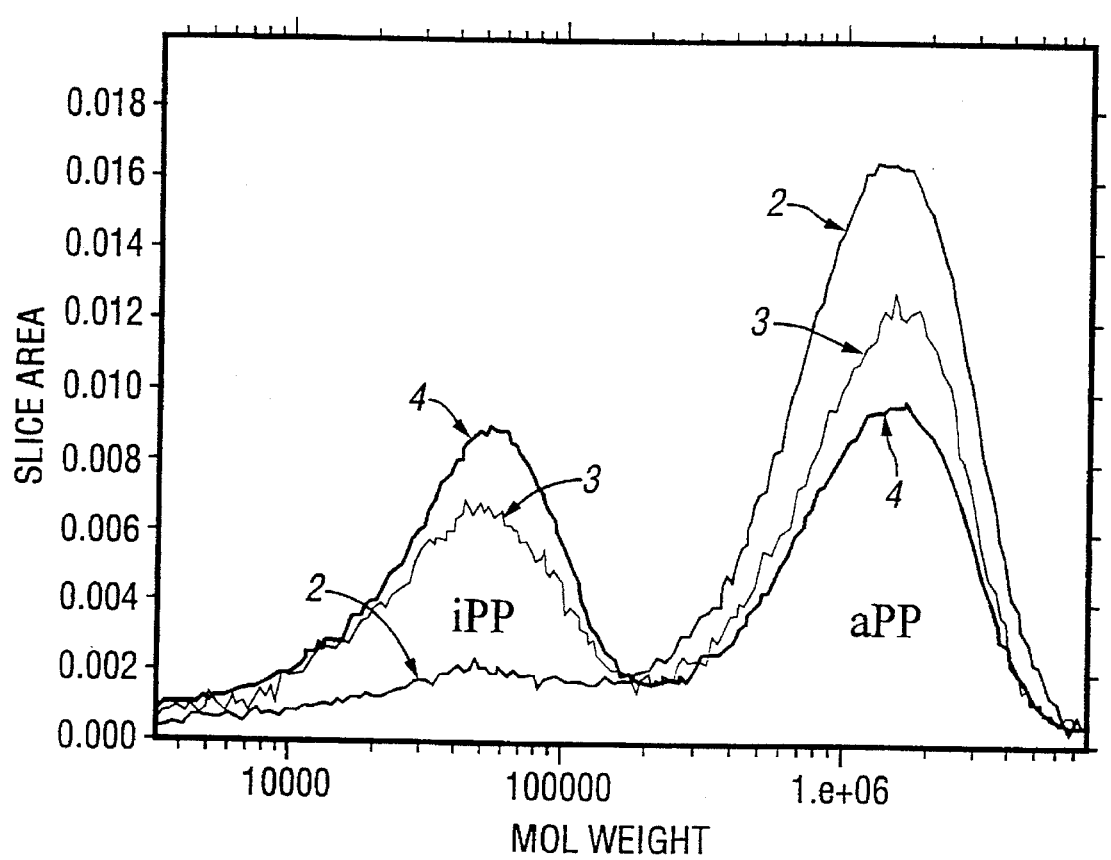

5,516,848

PROCESS TO PRODUCE THERMOPLASTIC ELASTOMERS

STATEMENT OF RELATED CASES

This invention is related to concurrently filed U.S. Ser. No. 08/381,055, which claims compositions related to this invention.

FIELD OF THE INVENTION

This invention relates to thermoplastic elastomers comprising alpha-olefins, preferably propylene, and a process to produce those thermoplastic elastomers comprising selecting two separate catalyst systems and polymerizing alpha-olefins using those catalyst systems. The thermoplastic elastomer products thereof have improved properties.

BACKGROUND OF THE INVENTION

It is well recognized that amorphous polypropylene(aPP) is a soft, rubbery, gel-like material which possesses very low crystallinity and therefore poor physical properties. Because of its poor mechanical strength, this material has found few practical uses compared to other forms of polypropylene such as isotactic polypropylene(iPP) and syndiotactic polypropylene (sPP), both of which are crystalline and therefore have good mechanical properties.

Individual polyolefins having certain characteristics are often blended together in the hopes of combining the positive attributes of the components. Typically, however, the result is a blend which displays a weighted average of the individual properties of the individual resins. For example European Patent Application 0 527 589 published Feb. 17, 1993, blends flexible low molecular weight amorphous polypropylene (aPP) with higher molecular weight stiff and strong isotactic polypropylene (iPP) to obtain compositions with balanced mechanical strength and flexibility. The composition shows better flexibility compared to the isotactic polypropylene but the elastic recovery properties are still poor. Yet it is desirable to find a composition that is both very flexible and very strong. It is an object of this invention to provide such a composition.

SUMMARY OF THE INVENTION

This invention relates to polyolefin compositions comprising: (1) amorphous poly-α-olefin having a weight average molecular weight (Mw) of at least about 150,000 and (2) crystalline poly-α-olefin having an Mw of less than about 300,000, provided that the Mw of the amorphous poly-α-olefin is greater than the Mw of the crystalline poly-α-olefin. This invention further relates to a method to produce Such poly-α-olefin compositions comprising polymerizing α-olefin in the presence of two different cyclopentadienyl transition metal compounds, or alternatively by producing said polymers independently and subsequently blending them together.

BRIEF DESCRIPTIONS OF THE DRAWINGS

FIG. 1 contains the GPC molecular weight distribution curves for examples 2, 3 and 4 in Table 5.

DESCRIPTION OF PREFERRED EMBODIMENTS

In a preferred embodiment this invention relates to polypropylene compositions comprising: amorphous polypropylene (aPP) having a weight average molecular weight of at least about 150,000 and crystalline polypropylene (cPP) having a weight average molecular weight of less than about 300,000, provided that the Mw of the amorphous polypropylene is greater than the Mw of the crystalline polypropylene. In additionally preferred embodiments, the amorphous polypropylene has a weight average molecular weight at least about 50,000 daltons greater than the crystalline polypropylene, preferably at least about 70,000 daltons greater, even more preferably about 100,000 daltons greater. In a preferred embodiment the amorphous polypropylene has an Mw of at least about 300,000. Likewise in a preferred embodiment the crystalline polypropylene has an Mw bewteen about 150,000 and about 20,000. For purposes of this invention, the term alpha-olefin shall mean $C_3$ to $C_{20}$ linear, branched or cyclic olefins.

In another preferred embodiment this invention relates to the in situ production of a blend (in situ blend) of amorphous polypropylene and crystalline polypropylene, such as isotactic polypropylene or syndiotactic polypropylene, by using two different cyclopentadienyl transition metal compounds with one or more activating agents, such an alumoxane or a non-coordinating anion activator, in the same polymerization zone under the same polymerization conditions at relatively the same time. The resulting product exhibits a good balance of physical strengths and elastic recovery properties.

In another embodiment of this invention, the polypropylene compositions can be produced in two separate reactors using different catalysts and subsequently physically blending these polymers together (physical blend).

Intimate Blends

Preferred blends of polypropylene preferably comprise about 10 to about 90 weight percent of an amorphous polypropylene having an Mw of at least about 150,000 and about 90 to about 10 weight percent, based upon the weight of the polymers, of a crystalline polypropylene having an Mw of less than about 300,000, provided that the Mw of the amorphous polypropylene is greater than the Mw of the crystalline polypropylene. In a further preferred embodiment the blend comprises about 30 to about 90 weight percent of an amorphous polypropylene and about 70 to 10 weight percent of a crystalline polypropylene. In a particularly preferred embodiment the blend comprises about 50 to about 90 weight percent of an amorphous polypropylene and about 50 to 10 weight percent of a crystalline polypropylene. In particularly preferred embodiments the crystalline polypropylene is an isotactic polypropylene.

The preferred intimate blends described above are preferably produced by simultaneously or in series polymerizing propylene with two or more cyclopentadienyl transition metal compounds selected to produce the desired molecular weights and crystalline or amorphous character. For example, one could choose two catalysts, one known to produce isotactic polypropylene and the other known to produce amorphous polypropylene, and use them simultaneously or in series to produce an intimate blend of the two polypropylene polymers so produced. In commercial process, isotactic polypropylene/amorphous polypropylene blends may be produced through mixed catalysts in a conventional solution or slurry process. In a preferred embodiment the cyclopentadienyl transition metal compounds are activated with the same a non-coordinating anion activator or alumoxane. It is a preferred aspect of this invention that two cyclopentadienyl transition metal compounds can be used at the same time and combined with the same non-coordinating anion activator or alumoxane to produce two active sites in the polymerization zone. Each of which is very specific for a particular polymer product.

Catalyst System and Selection

The catalyst systems comprise two or more transition metal components and an activator which can be either a conventional Lewis acid activator such as an alumoxane or a modified alumoxane or a non-coordinating anion activator. The transition metal components of the catalyst are preferably a cyclopentadienyl derivatives of a Group 4 metal of the periodic table of the elements, including mono-, di- and tri-cyclopentadienyls and their derivatives of the transition metals. Particularly, transition metal components are derivatives of the Group 4 metals, preferably titanium, zirconium and hafnium, (preferably hafnium and zirconium for bis-cyclopentadienyl compounds and titanium for mono-cyclopentadienyl compounds). The activator is preferably methylalumoxane, a modified alumoxane or a non-coordinating anion activator comprising boron. In general at least two transition metal components are employed in formation of the catalyst system with one activator, however other multiple combinations of transition metal compounds and activators are also within the scope of this invention.

Catalyst System—General Description

The process of this invention is practiced with that class of catalysts referred to, disclosed, and described in EPA 277 003 and EPA 277 004, both published Aug. 3, 1988 and EPA 520,732, U.S. Pat. Nos. 5,055,438; 5,198,401; 5,055,438; 5,264,405; 5,324,800; 5,017,714; and 5,096,867; and WO 92 00333.

The catalysts used in this invention can be represented by one of the following general formulae (all references to Groups being the new Group notation of the Period Table of the Elements as described by Chemical and Engineering News, 63(5), 27, 1985):

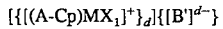  (1)

  (2)

3.
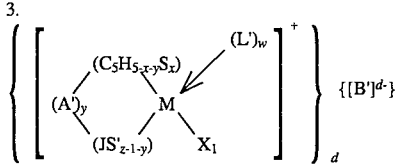

wherein:

(A-Cp) is either (Cp) (Cp*) or Cp-A'-Cp*; Cp and Cp* are the same or different cyclopentadienyl rings substituted with from zero to five substituent Groups S, each substituent Group S being, independently, a radical Group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S Groups are joined forming a $C_4$ to $C_{20}$ ring to give a saturated or unsaturated polycyclic cyclopentadienyl ligand;

A' is a bridging Group;

$(C_5H_{5-y-x}S_x)$ is a cyclopentadienyl ring substituted with from zero to five S radicals as defined above;

x is from 0 to 5 denoting the degree of substitution;

M is titanium, zirconium or hafnium;

$X_1$ is a hydride radical, hydrocarbyl radical, substituted-hydrocarbyl radical, hydrocarbyl-substituted organometalloid radical or halocarbyl-substituted organometalloid radical which radical may optionally be covalently bonded to both or either M and L or L' or all or any M, S or S', and provided that $X_1$ is not a substituted or unsubstituted cyclopentadienyl ring;

$(JS'_{z-1-y})$ is a heteroatom ligand in which J is an element from Group 15 of the Periodic Table of Elements with a coordination number of 3 or an element from Group 16 with a coordination number of 2; S' is a radical Group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

y is 0 or 1;

L is an olefin, diolefin or aryne ligand. L' is the same as L, and can additionally be an amine, phosphine, ether, or sulfide ligand, or any other neutral Lewis base; L' can also be a second transition metal compound of the same type such that the two metal center M and M* are bridged by $X_1$ and $X'_1$, wherein M* has the same meaning as M, $X'_1$, $X_2$ and $X'_2$ have the same meaning as $X_1$, where such dimeric compounds which are precursors to the cationic portion of the catalyst are represented by the formula:

4.
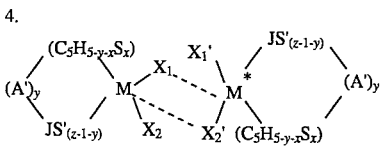

wherein w is an integer from 0 to 3;

B is a chemically stable, non-nucleophilic anionic complex having a molecular diameter about or greater than 4 angstroms or an anionic Lewis-acid activator resulting from the reaction of a Lewis-acid activator with the precursor to the cationic portion of the catalyst system described in formulae 1–4. When B' is a Lewis-acid activator, $X_1$ can also be an alkyl Group donated by the Lewis-acid activator; and d is an integer representing the charge of B.

The catalysts are preferably prepared by combining at least two components. In one preferred method, the first component is a cyclopentadienyl derivative of a Group 4 metal compound containing at least one ligand which will combine with the second component or at least a portion thereof such as a cation portion thereof. The second component is an ion-exchange compound comprising a cation which will irreversibly react with at least one ligand contained in said Group 4 metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallacarboranes.

In general, suitable anions for the second component may be any stable and bulky anionic complex having the following molecular attributes: 1) the anion should have a molecular diameter greater than 4 angstroms; 2) the anion should form stable ammonium salts; 3) the negative charge on the anion should be delocalized over the framework of the anion or be localized within the core of the anion; 4) the anion should be a relatively poor nucleophile; and 5) the anion should not be a powerful reducing to oxidizing agent.

Anions meeting these criteria—such as polynuclear boranes, carboranes, metallacarboranes, polyoxoanions and anionic coordination complexes are well described in the chemical literature.

The cation portion of the second component may comprise Bronsted acids such as protons or protonated Lewis bases or may comprise reducible Lewis acids such as ferricinum, tropylium, triphenylcarbenium or silver cations.

In another preferred method, the second component is a Lewis-acid complex which will react with at least one ligand of the first component, thereby forming an ionic species described in formulae 1–4 with the ligand abstracted from the first component now bound to the second component. Alumoxanes and especially methylalumoxane, the product formed from the reaction of trimethylaluminum in an aliphatic or aromatic hydrocarbon with stoichiometric quantities of water, are particularly preferred Lewis-acid second components. Modified alumoxanes are also preferred. Alumoxanes are well known in the art and methods for their preparation are illustrated by U.S. Pat. Nos. 4,542,199; 4,544,762; 5,015,749; and 5,041,585. A technique for preparing modified alumoxanes has been disclosed in U.S. Pat. No. 5,041,584, in EPA 0 516 476, and in EPA 0 561 476, which are incorporated by reference herein.

Upon combination of the first and second components, the second component reacts with one of the ligands of the first component, thereby generating an anion pair consisting of a Group 4 metal cation and the aforementioned anion, which anion is compatible with and non-coordinating towards the Group 4 metal cation formed from the first component. The anion of the second compound must be capable of stabilizing the Group 4 metal cation's ability to function as a catalyst and must be sufficiently labile to permit displacement by an olefin, diolefin or an acetylenically unsaturated monomer during polymerization. The catalysts of this invention may be supported. U.S. Pat. Nos. 4,808,561, issued Feb. 28, 1989; 4,897,455 issued Jan. 3, 1990; 5,057,475 issued Oct. 15, 1991; U.S. patent application Ser. No. 459,921 (published as PCT International publication WO 91/09882), Canadian Patent 1,268,753, U.S. Pat. No. 5,240,894 and WO 94 03506 disclose such supported catalysts and the methods to produce such and are herein incorporated by reference.

A. The Transition Metal Components

The Group 4 metal compounds; i.e., titanium, zirconium and hafnium metallocene compounds, useful as first compounds in the preparation of the catalyst of this invention are cyclopentadienyl derivatives of titanium, zirconium and hafnium. In general, useful titanocenes, zirconocenes and hafnocenes may be represented by the following general formulae:

(A-Cp)MX$_1$X$_2$                                                                (5)

(A-Cp)ML                                                                        (6)

8.

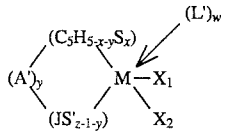

wherein:

(A-Cp) is either (Cp)(Cp*) or Cp-A'-Cp*; Cp and Cp* are the same or different cyclopentadienyl rings substituted with from zero to five substituent Groups S, each substituent Group S being, independently, a radical group which is hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S Groups are joined forming a C$_4$ to C$_{20}$ ring to give a saturated or unsaturated polycyclic cyclopentadienyl ligand;

R is a substituent on one of the cyclopentadienyl radicals which is also bonded to the metal atom;

A' is a bridging Group;

y is 0 or 1;

(C$_5$H$_{5-y-x}$S$_x$) is a cyclopentadienyl ring substituted with from zero to five S radicals as defined above;

x is from 0 to 5 denoting the degree of substitution;

(JS'$_{z-1-y}$) is a heteroatom ligand in which J is an element from Group 15 of the Periodic Table of Elements with a coordination number of 3 or an element from Group 16 with a coordination number of 2, S' is a radical Group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

L is an olefin, diolefin or aryne ligand. L' is the same as L and can additionally be an amine, phosphine, ether, or sulfide ligand, or any other neutral Lewis base; L' can also be a second transition metal compound of the same type such that the two metal centers M and M* are bridged by X$_1$ and X'$_1$, wherein M* has the same meaning as M, X'$_1$ has the same meaning as X$_1$ and X'$_2$ has the same meaning as X$_2$ where such dimeric compounds which are precursors to the cationic portion of the catalyst are represented by the formula:

9.

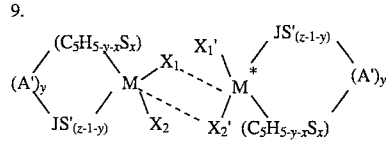

w is an integer from 0 to 3; and

X$_1$ and X$_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or X$_1$ and X$_2$ are joined and bound to the metal atom to form a metallacycle ring containing from about 3 to about 20 carbon atoms; or X$_1$ and X$_2$ together can be an olefin, diolefin or aryne ligand; or when Lewis-acid activators, such as methylalumoxane, which are capable of donating an X$_1$ ligand as described above to the transition metal component are used, X$_1$ and X$_2$ may independently be a halogen, alkoxide, aryloxide, amide, phosphide or other univalent anionic ligand or both X$_1$ and X$_2$ can also be joined to form a anionic chelating ligand and with the proviso that X$_1$ and X$_2$ are not a substituted or unsubstituted cyclopentadienyl ring.

Tables A and B depict representative constituent moieties for the metallocene components of formulae 5–8. The list is for illustrative purposes only and should not be construed to be limiting in any way. A number of final components may be formed by permuting all possible combinations of the constituent moieties with each other. Illustrative compounds of the formula 5 type are: bis(cyclopentadienyl)hafnium dimethyl, ethylenebis(tetrahydroindenyl)zirconium dihidryde, bis(pentamethyl)zirconium diethyl, dimethylsilyl(1-fluorenyl)(cyclopentadienyl)titanium dichloride and the like. Illustrative compounds of the formula 6 type are:

bis(cyclopentadienyl)(1,3-butadiene)zirconium, bis(cyclopentadienyl)(2,3-dimethyl-1,3-butadiene) zirconium, bis(pentamethylcyclopentadienyl)(benzene) zirconium, bis(pentamethylcyclopentadienyl) titanium ethylene and the like. Illustrative compounds of the formula 7 type are: (pentamethylcyclopentadienyl)(tetramethylcyclopentadienylmethylene) zirconium hydride, (pentamethylcyclopentadienyl)(tetramethylcyclopentadienylmethylene) zirconium phenyl and the like. Illustrative compounds of the formula 8 type are: dimethylsilyl(tetramethylcyclopentadienyl) (t-butylamido)zirconium dichloride, ethylene(methylcyclopentadienyl)(phenylamido)titanium dimethyl, methylphenylsilyl-(indenyl)(phenyphosphido)hafnium dihydride and (pentamethylcyclopentadienyl)(di-t-butylamido)hafnium dimethoxide.

The conditions under which complexes containing neutral Lewis base ligands such as ether or those which form dimeric compounds is determined by the steric bulk of the ligands about the metal center. For example, the t-butyl Group in $Me_2Si(Me_4C_5)(N-t-Bu)ZrCl_2$ has greater steric requirements that the phenyl Group in $Me_2Si(Me_4C_5)(NPh)ZrCl_2 \cdot Et_2O$ thereby not permitting ether coordination in the former compound in its solid state. Similarly, due to the decreased steric bulk of the trimethylsilylcyclopentadienyl Group in $[Me_2Si(Me_3SiC_5H_3)(N-t-Bu)ZrCl_2]_2$ versus that of the tetramethylcyclopentadienyl Group in $Me_2Si(Me_4C_5)(N-t-Bu)ZrCl_2$, the former compound is dimeric and the latter is not.

TABLE A

| A' | Cp, Cp*, CpR or $(C_5H_{5-y-x}S_x)$ |
|---|---|
| dimethylsilyl | cyclopentadienyl |
| diethylsilyl | methylcyclopentadienyl |
| di-n-propylsilyl | 1,2-dimethylcyclopentadienyl |
| diisopropylsilyl | 1,3-dimethylcyclopentadienyl |
| di-n-butylsilyl | indenyl |
| di-t-butylsilyl | 1,2-diethylcyclopentadienyl |
| di-n-hexylsilyl | tetramethylcyclopentadienyl |
| methylphenylsilyl | ethylcyclopentadienyl |
| ethylmethylsilyl | n-butylcyclopentadienyl |
| diphenylsilyl | cyclohexlmethylcyclopentadienyl |
| di(p-t-butylphenethylsilyl) | n-octylcyclopentadienyl |
| n-hexylmethylsilyl | beta-phenylpropylcyclopentadienyl |
| cyclopentamethylenesilyl | tetrahydroindenyl |
| cyclotetramethylenesilyl | propylcyclopentadienyl |
| cyclotrimethylenesilyl | t-butylcyclopetnadienyl |
| dimethylgermanyl | benzylcyclopentadienyl |
| diethylgermanyl | diphenylmethylcyclopentadienyl |
| phenylamido | trimethylgermylcyclopentadienyl |
| t-butylamido | trimethylstannylcyclopentadienyl |
| methylamido | triethylplumbylcyclopentadienyl |
| t-butylphosphido | trifluromethylcyclopentadienyl |
| ethylphosphido | trimethylsilylcyclopentadienyl |
| phenylphosphido | pentamethylcyclopentadienyl (y = 0) |
| methylene | fluorenyl |
| dimethylmethylene | octahydrofluorenyl |
| diethylmethylene | N,N-dimethylamidocyclopentadienyl |
| ethylene | dimethylphosphidocyclopentadienyl |
| dimethylethylene | methoxycyclopentadienyl |
| dipropylethylene | (N,N-dimethylamidomethyl)-cyclopentadienyl |
| propylene | 2-methylindenyl |
| dimethylpropylene | 2-phenylindenyl |
| diethylpropylene | 1-methyl-3-n-butylcyclopentadienyl |
| 1,1-dimethyl-3,3-dimethylpropylene | 1,3-di-t-butylcyclopentadienyl |
| tetramethyidisiloxane | 1-t-butyl-3-methylcyclopentadienyl |
| 1,1,4,4-tetramethyl-disilylethylene | |

TABLE B

| $(JS_{z-1-y}')(y = 1)$ | $x_1$ or $X_2$ | M |
|---|---|---|
| t-butylamido | hydride | zirconium |
| phenylamido | methyl | hafnium |
| p-n-butylphenylamido | ethyl | titanium |
| cyclohexylamido | phenyl | |
| perflurophenylamido | n-propyl | |
| n-butylamido | isopropyl | |
| methylamido | n-butyl | L or L' |
| ethylamido | amyl | ethylene |
| n-propylamido | isoamyl | propylene |
| isopropylamido | hexyl | 1-butene |
| benzylamido | isobutyl | 1,4-hexadiene |
| adamantylamido | heptyl | 1,3-butadiene |
| t-butylphosphido | octyl | 1,3-hexadiene |
| ethylphosphido | nonyl | acetylene |
| phenylphosphido | decyl | methylacetylene |
| cyclohexylphosphido | cetyl | ethylacetylene |
| oxo | benzyl | benzyne |
| sulfide | methylidene (both X) ethylidene (both X) | |
| $(JS_{z-1-y})(y = 0)$ | | L' |
| methoxide | | diethylether |
| ethoxide | | demethylether |
| methylthio | | trimethylamine |
| ethylthio | | triphenylamine |
| | | triethylamine |
| | | triphenylphosphine |
| | | tetrahydrofuran |
| | | thiophene |
| | | dimethylsulfide |

B. The Activator Component

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In general, the activator compounds containing single anionic coordination complexes which are useful in this invention may be represented by the following general formula:

$$[(L''-H)^+]_d[(M')^{m+}Q_1 \ldots Q_n]^{d-} \qquad (10)$$

wherein:

H is a hydrogen atom;

[L"-H] is a Bronsted acid;

M' is a metal or metalloid;

$Q_1$ to $Q_n$ are, independently, bridged or unbridged hydride radicals, dialkylamido radicals, alkoxide and aryloxide radicals, hydrocarbyl and substituted-hydrocarbyl radicals, halocarbyl and substituted-halocarbyl radicals and hydrocarbyl and halocarbyl-substituted organometalloid radicals and any one, but not more than one, of $Q_1$ to $Q_n$ may be a halide radical;

m is an integer representing the formal valence charge of M; and n is the total number of ligands q.

As indicated above, any metal or metalloid capable of forming an anionic complex which is stable in water may be used or contained in the anion of the second compound. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

The preferred activator compounds comprising boron may be represented by the following general formula:

$$[L''\text{-}H]^+[BAr_1Ar_2X_3X_4]^- \qquad (11)$$

wherein:

B is a boron in a valence state of 3;

$Ar_1$ and $Ar_2$ are the same or different aromatic or substituted-aromatic hydrocarbon radicals containing from about 6 to about 20 carbon atoms and may be linked to each other through a stable bridging Group; and $X_3$ and $X_4$ are, independently, hydride radicals, hydrocarbyl and substituted-hydrocarbyl radicals, halocarbyl and substituted-halocarbyl radicals, hydrocarbyl- and halocarbyl-substituted organometalloid radicals, disubstituted pnictogen radicals, substituted chalcogen radicals and halide radicals, with the proviso that $X_3$ and $X_4$ will not be halide at the same time.

In general, $Ar_1$ and $Ar_2$ may, independently, be any aromatic of substituted-aromatic hydrocarbon radical. Suitable aromatic radicals include, but are not limited to, phenyl, naphthyl and anthracenyl radicals. Suitable substituents on the substituted-aromatic hydrocarbon radicals, include, but are not necessarily limited to, hydrocarbyl radicals, organometalloid radicals, alkoxy and aryloxy radicals, alkylamido radicals, fluorocarbyl and fluorohydrocarbyl radicals and the like such as those useful as $X_3$ and $X_4$. The substituent may be ortho, meta or para, relative to the carbon atoms bonded to the boron atom. When either or both $X_3$ and $X_4$ are a hydrocarbyl radical, each may be the same or a different aromatic or substituted-aromatic radical as are $Ar_1$ and $Ar_2$, or the same may be a straight or branched alkyl, alkenyl or alkynyl radical, a cyclic hydrocarbon radical or an alkyl-substituted cyclic hydrocarbon radical. $X_3$ and $X_4$ may also, independently be alkoxy or dialkylamido radicals wherein the alkyl portion of said alkoxy and dialkylamido radicals, hydrocarbyl radicals and organometalloid radicals and the like. As indicated above, $Ar_1$ and $Ar_2$ could be linked to either $X_3$ or $X_4$. Finally, $X_3$ and $X_4$ may also be linked to each other through a suitable bridging Group.

Illustrative, but not limiting, examples of boron compounds which may be used as an activator component in the preparation of the improved catalysts of this invention are trialkyl-substituted ammonium salts such as triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammoniumtetra(p-trifluoromethylphenyl)boron, tri(n-butyl)ammonium tetra(o-tolyl)boron and the like; N,N-dialkyl anilinium salts such as N,N-dimethylanilinium tetra(pentafluorophenyl)boron, N,N-diethylanilinium tetra(phenyl)boron, N,N-2,4,5-pentamethylanilinium tetra(phenyl)boron and the like; dialkyl ammonium salts such as di(i-propyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra(phenyl)boron, tri(dimethylphenyl)phosphonium tetra(phenyl)boron and the like; carbonium salt such as trityl teta(pentafluorophenyl)boron and the like.

Similar lists of suitable compounds containing other metals and metalloids which are useful as activator components may be made, but such lists are not deemed necessary to a complete disclosure. In this regard, it should be noted that the foregoing list is not intended to be exhaustive and that other useful boron compounds as well as useful compounds containing other metals or metalloids would be readily apparent to those skilled in the art from the foregoing general equations.

The most preferred activator compounds comprising boron may be represented by the following general formula:

$$[L''\text{-}H]^+[B(C_6F_5)_3Q]^- \qquad (12)$$

wherein:

F is fluorine, C is carbon and B, L', and Q are defined hereinabove. Illustrative but not limiting, examples of most preferred activator compounds comprising boron which may be used in the preparation of the improved catalysts of this invention include N,N-dialkylanilinium salts (L'=N,N-dialkylaniline) where Q is a simple hydrocarbyl such as methyl, butyl, cyclohexyl, or phenyl or where Q is a polymeric hydrocarbyl of indefinite chain length such as polystyrene, polyisoprene, or poly-paramethylstyrene. Polymeric Q substituents on the most preferred anion offer the advantage of providing a highly soluble ion-exchange activator component and final ionic catalyst. Soluble catalysts and/or precursors are often preferred over insoluble waxes, oils, phases, or solids because they can be diluted to a desired concentration and can be transferred easily using simple equipment in commercial processes.

Activator components based on anions which contain a plurality of boron atoms may be represented by the following general formulae:

$$[L''\text{-}H]_c[(CX)_a(BX)_mX_b]^{c-} \text{ or} \qquad (13)$$

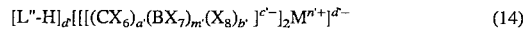

$$[L''\text{-}H]_d[[[(CX_6)_a(BX_7)_{m'}(X_8)_{b'}]^{c'-}]_2M^{n'+}]^{d-} \qquad (14)$$

wherein

[L"-H] is either $H^+$ or a Bronsted acid derived from the protonation of a neutral Lewis base;

X, X', X", $X_6$, $X_7$ and $X_8$ are, independently, hydride radicals, halide radicals, hydrocarbyl radicals, substituted-hydrocarbyl radicals, halocarbyl radicals, substituted-halocarbyl radicals, or hydrocarbyl- or halocarbyl-substituted organometalloid radicals;

M is a transition metal;

a and b are integers>0; c is an integer>1; a+b+c=an even-numbered integer from 2 to about 8; and m is an integer ranging from 5 to about 22;

a and b are the same or a different integer 0; c is an integer>2; a+b+c=an even-numbered integer from 4 to about 8; m is an integer from 6 to about 12; n is an integer such that 2c−n=d; and d is an integer>1.

Preferred anions of this invention comprising a plurality of boron atoms comprise:

(1) A trisubstituted ammonium salt of a borane or carborane anion satisfying the general formula:

$$[(CH)_{ax}(BH)_{bx}]^{cx-} \tag{15}$$

wherein:

ax is either 0 or 1; cx is either 1 or 2; ax+cx= 2; and bx is an integer ranging from about 10 to 12;

(2) A trisubstituted ammonium salt of a borane or carborane or a neutral borane or carborane compound satisfying the general formula:

$$[(CH)_{ay}(BH)_{my}(H)_{by}]^{cy-} \tag{16}$$

wherein:

ay is an integer from 0 to 2; by is an integer from 0 to 3; cy is an integer from 0 to 3; ay+by+cy= 4; and my is an integer from about 9 to about 18; or (3) A trisubstituted ammonium salt of a metallaborane or metallacarborane anion satisfying the following general formula:

$$[[[(CH)_{az}(BH)_{mz}(H)_{bz}]^{cz-}]_2 M^{nz+}]^{dz-} \tag{17}$$

wherein:

az is an integer from 0 to 2; bz is an integer from 0 to 2; cz is either 2 or 3; mz is an integer from about 9 to 11; az+bz+cz=4; and nz and dz are, respectively, 2 and 2 or 3 and 1.

Illustrative, but not limiting, examples of second components which can be used in preparing catalyst systems utilized in the process of this invention wherein the anion of the second component contains a plurality of boron atoms (as in formulae 10–17) are mono-, di-, trialkylammonium and phosphonium and dialkylarylammonium and -phosphonium salts such as bis[tri(n-butyl)ammonium] dodecaborate, bis[tri(n-butyl)ammonium] decachlorodecaborate, tri(n-butyl)ammonium dodecachlorododecaborate, tri(n-butyl)ammonium 1-carbadecaborate, tri(n-butyl)ammonium 1-carbaudecaborate, tri(n-butyl)ammonium 1-carbadodecaborate, tri(n-butyl)ammonium 1-trimethylsilyl- 1-carbadecaborate, tri(n-butyl)ammonium dibromo-1-carbadodecaborate; borane and carborane complexes and salts of borane and carborane anions such as decaborane (14), 7,8-dicarbaudecaborane(13), 2,7-dicarbaundecaborane(13), undecahydrido-7,8-dimethyl- 7,8-dicarbaundecaborane, tri(n-butyl)ammonium 6-carbadecaborate(12), tri(n-butyl)ammonium 7-carbaundecaborate, tri(n-butyl)ammonium 7,8-dicarbaundecaborate and metallaborane anions such as tri(n-butyl)ammonium bis(nonahydrido-1,3-dicarbanonaborato)cobaltate(III), tri(n-butyl)ammonium bis(undecahydrido-7,8-dicarbaundecaborato) ferrate(III), tri(n-butyl)ammonium bis(undecahydrido- 7,8-dicarbaundecaborato) cobaltate(III), tri(n-butyl)ammonium bis(undecahydrido-7,8-dicarbaunaborato) nikelate(III), tri(n-butyl)ammonium bis(nonahydrido- 7,8-dimethyl-7,8-dicarbaundecaborato)ferrate(III), tri(n-butyl)ammonium bis(tribromooctahydrido-7,8-dicarbaundecaborato)cobaltate(III), tri(n-butyl) ammonium bis(undecahydridodicarbadodecaborato) cobaltate(III) and bis[tri(n-butyl)ammonium] bis(undecahydrido-7-carbaundecaborato) cobaltate(III). A similar list of representative phosphonium compounds can be recited as illustrative second compounds, but for the sake of brevity, it is simply noted that the phosphonium and substituted-phosphonium salts corresponding to the listed ammonium and substituted-ammonium salts could be used as second compounds in the present invention.

The preferred activator compounds comprising Lewis-acid activators and in particular alumoxanes are represented by the following general formulae:

$$(R^3\text{-Al-O})_p \tag{18}$$

$$R^4(R^5\text{-Al-O})_p\text{-AlR}^6{}_2 \tag{19}$$

$$(M')^{m+}Q'_m \tag{20}$$

An alumoxane is generally a mixture of both the linear and cyclic compounds. In the general alumoxane formula, $R^3$, $R^4$, $R^5$ and $R^6$ are, independently a $C_1$–$C_6$ alkyl radical, for example, methyl, ethyl, propyl, butyl or pentyl and "p" is an integer from 1 to about 50. Most preferably, $R^3$, $R^4$, $R^5$ and $R^6$ are, each methyl and "p" is a least 4. When an alkyl aluminum halide is employed in the preparation of the alumoxane, one or more $R^{3-6}$ Groups may be halide. M' and M are as described previously and Q' is a partially or fully fluorinated hydrocarbyl.

It is recognized that alumoxane is not a discrete material. A typical alumoxane will contain free trisubstituted or trialkyl aluminum, bound trisubstituted or trialkyl aluminum, and alumoxane molecules of varing degree of oligomerization. Those methylalumoxanes most preferred contain lower levels of trimethylaluminum. Lower levels of trimethylaluminum can be achieved by reaction of the trimethylaluminum with a Lewis base or by vacuum distillation of the trimethylaluminum or by any other means known in the art. It is also recognized that after reaction with the transition metal compound, some alumoxane molecules are in the anionic form as represented by equations 1–3, thus for our purposes are considered "non-coordinating" anions.

The activator compositions most preferred for forming the ionic catalyst used in this process are those containing a tetrapentafluorphenyl boron anion; two or more tripentafluorophenyl boron anion Groups covalently bond to a central atomic molecular or polymeric complex or particle; or methylalumoxane, or a modified methylalumoxane.

Other examples of activator specific compositions which may be used to form an anionic catalyst useful in this invention are identified and more fully described in European Patent Application Nos. 0 277 003 and 0 277 004 and WO 92/00333 which are hereby incorporated by reference.

The Choice of Transition Metal Catylst Components

The catalyst system of this invention comprises two or more transition metal compounds as described above. At least one of the compounds must be capable of producing a high molecular weight crystalline poly-α-olefin, preferrably isotatic polypropylene or syndiotactic polypropylene. A second compound must be capable of producing a high molecular weight amorphous poly-α-olefin, preferrably atactic polypropylene.

The preferred choice of transition metal component for the high molecular weight amorphous polymer fraction is the mono-cyclopentadienyl transition metal component of equation 8 where y is equal to 1. This preferred component is illustrated in equation 21:

21.

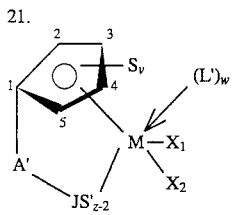

where A', J, S', $X_1$, $X_2$, L', z and w as are previously defined and M is titanium. Substituent $S_v$ is defined to be the same as S in equation 8 where the subscript "v" denotes the carbon atom on the cyclopentadienyl ring to which the substituent is bonded and where there can be zero, two or four substituents, S, on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with S groups that are of approximately of the same steric bulk. Typically the size of these S groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with S groups and be considered symmetric as long as each of the symmetrical pairs are of similar steric bulk. Additionally, two adjacent S-groups in the 3 and 4 position may be linked to form a ring provided that the new ring is also symmetrically substituted.

Preferred mono-cyclopentadienyl transition metal compounds which, according to the present invention, provide catalyst systems which are specific to the production of high molecular weight atactic poly-α-olefins include
dimethylsilyl(tetramethylcyclopentadienyl)(cyclododecyl amido) titanium dichloride,
dimethylsilyl(tetramethylcyclopentadienyl)(cyclohexylamido) titanium dichloride,
dimethylsilyl(tetramethylcyclopentadienyl)(1-adamantylamido) titanium dichloride,
dimethylsilyl(tetramethylcyclopentadienyl)(t-butylamido) titanium dichloride,
dimethylsilyl(tetramethylcyclopentadienyl)(s-butylamido) titanium dichloride,
dimethylsilyl(tetramethylcyclopentadienyl)(n-butylamido) titanium dichloride,
dimethylsilyl(tetramethylcyclopentadienyl)(exo-2-norbornylamido) titanium dichloride,
diethylsilyl(tetramethylcyclopentadienyl)(cyclododecylamido) titanium dichloride,
diethylsilyl(tetramethylcyclopentadienyl)(exo-2-norbornylamido) titanium dichloride,
diethylsilyl(tetramethylcyclopentadienyl)(cyclohexylamido) titanium dichloride,
diethylsilyl(tetramethylcyclopentadienyl)(1-adamantylamido) titanium dichloride,
methylene(tetramethylcyclopentadienyl)(cyclododecylamido) titanium dichloride,
methylene(tetramethylcyclopentadienyl)(exo-2-norbornylamido) titanium dichloride,
methylene(tetramethylcyclopentadienyl)(cyclohexylamido) titanium dichloride,
methylene(tetramethylcyclopentadienyl)(1-adamantylamido) titanium dichloride,
dimethylsilyl(tetramethylcyclopentadienyl)(cyclododecyl amido) titanium dimethyl,
dimethylsilyl(tetramethylcyclopentadienyl)(exo-2-norbornylamido) titanium dimethyl,
dimethylsilyl(tetramethylcyclopentadienyl)(cyclohexylamido) titanium dimethyl,
dimethylsilyl(tetramethylcyclopentadienyl)(1-adamantylamido) titanium dimethyl,
dimethylsilyl(2,5-dimethylcyclopentadienyl)(cyclododecylamido) titanium dichloride,
dimethylsilyl(2,5-dimethylcyclopentadienyl)(exo- 2-norbornylamido) titanium dichloride,
dimethylsilyl(2,5-dimethylcyclopentadienyl)(cyclohexylamido) titanium dichloride,
dimethylsilyl(2,5-dimethylcyclopentadienyl)( 1-adamantylamido) titanium dichloride,
dimethylsilyl(3,4-dimethylcyclopentadienyl)(cyclododecylamido) titanium dichloride,
dimethylsilyl(3,4-dimethylcyclopentadienyl)(exo- 2-norbornylamido) titanium dichloride,
dimethylsilyl(3,4-dimethylcyclopentadienyl)(cyclohexylamido) titanium dichloride,
dimethylsilyl(3,4-dimethylcyclopentadienyl)( 1-adamantylamido) titanium dichloride,
dimethylsilyl(2-ethyl-5-methylcyclopentadienyl)(cyclododecylamido) titanium dichloride,
dimethylsilyl(2-ethyl-5-methylcyclopentadienyl)(exo- 2-norbornylamido) titanium dichloride,
dimethylsilyl(2-ethyl-5-methylcyclopentadienyl)(cyclohexylamido) titanium dichloride,
dimethylsilyl(2-ethyl-5-methylcyclopentadienyl)( 1-adamantylamido) titanium dichloride,
dimethylsilyl(3-ethyl-4-methylcyclopentadienyl)(cyclododecylamido) titanium dichloride,
dimethylsilyl(3-ethyl-4-methylcyclopentadienyl)(exo- 2-norbornylamido) titanium dichloride,
dimethylsilyl(3-ethyl-4-methylcyclopentadienyl)(cyclohexylamido) titanium dichloride,
dimethylsilyl(3-ethyl-4-methylcyclopentadienyl)( 1-adamantylamido) titanium dichloride,
dimethylsilyl(2-ethyl-3-hexyl-5-methyl-4-octylcyclopentadienyl)(cyclododecylamido) titanium dichloride,
dimethylsilyl(2-ethyl-3-hexyl-5-methyl-4-octylcyclopentadienyl)(exo- 2-norbornylamido) titanium dichloride,
dimethylsilyl(2-ethyl-3-hexyl-5-methyl-4-octylcyclopentadienyl)(cyclohexylamido) titanium dichloride,
dimethylsilyl(2-ethyl-3-hexyl-5-methyl-4-octylcyclopentadienyl)( 1-adamantylamido) titanium dichloride dimethylsilyl(2-tetrahydroindenyl)(cyclododecylamido) titanium dichloride,
dimethylsilyl(2-tetrahydroindenyl)(cyclohexylamido) titanium dichloride,
dimethylsilyl(2-tetrahydroindenyl)(1-adamantylamido) titanium dichloride,
dimethylsilyl(2-tetrahydroindenyl)(exo- 2-norbornylamido) titanium dichloride and the like.

The most preferred species are:
dimethylsilyl(tetramethylcyclopentadienyl)(cyclododecyl amido) titanium dichloride,
dimethylsilyl(tetramethylcyclopentadienyl)(cyclohexylamido) titanium dichloride,
dimethylsilyl(tetramethylcyclopentadienyl)(1-adamantylamido) titanium dichloride,
dimethylsilyl(tetramethylcyclopentadienyl)(exo-2-norbornylamido) titanium dichloride,
dimethylsilyl(tetramethylcyclopentadienyl)(cyclododecyl amido) titanium dimethyl,
dimethylsilyl(tetramethylcyclopentadienyl)(cyclohexylamido) titanium dimethyl,
dimethylsilyl(tetramethylcyclopentadienyl)(1-adamantylamido) titanium dimethyl, and dimethylsilyl(tetramethylcyclopentadienyl)(exo-2-norbornylamido) titanium dimethyl.

The choice of transition metal component for the crystalline polymer fraction is a subset of the transition metal component of equations 5–7. This preferred component is illustrated in equation 22:

22.
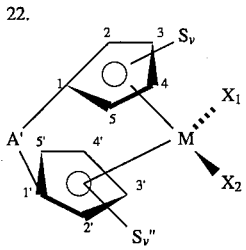

wherein A', M, $X_1$ and $X_2$ are as previously defined in equations 5–7. Substituents $S_v$ and $S''_v$ are defined as S in equations 5–7 where the subscript "v" denotes the carbon atom on the Cp-ring to which the substituent is bonded.

Preferably metallocene precursors for producing poly-α-olefins having enhanced isotactic character are those of Equation 22 where $S_v$ and $S''_v$ are chosen such that the metallocene framework 1) has no plane of symmetry containing the metal center, and 2) has a $C_2$-axis of symmetry through the metal center. Such complexes, such as rac-Me$_2$Si(indenyl)$_2$ZrMe$_2$ and rac-Me$_2$Si(indenyl)$_2$HfMe$_2$, are well known in the art and generally produce isotactic polymers with higher degrees of stereoregularity than the less symmertic chiral systems. Likewise another preferred class of transition metal compounds that can produce isotactic polymers useful in this invention are those monocyclopentadienyl catalysts disclosed in U.S. Pat. No. 5,026,798, which is incorporated by reference herein.

Preferred chiral racemic metallocene compounds which, according to the present invention, provide catalyst systems which are specific to the production of isotactic poly-α-olefins include dimethylsilylbis(3-methylcyclopentadienyl)ziconium dimethyl,
dimethylsilylbis(indenyl) zirconium dihydride,
dimethylsilylbis(tetrahydroindenyl) zirconium dimethyl,
-hafnium dimethyl and -titanium dimethyl,
(1,1,2,2-tetramethyldisilanylene)bis(3-methylcyclopentadienyl) zirconium dimethyl,
methylenebis(tetrahydroindenyl) zirconium dimethyl,
ethylenebis(tetrahydroindenyl) zirconium dihydride,
-dimethyl,
and -diphenyl,
dimethylsilylbis(2,3-dimethylcyclopentadienyl) zirconium dihydride,
dimethylsilylbis(3-trimethylsilylcyclopentadienyl) zirconium dimethyl,
(1,1,2,2-tetramethyldisilanylene)bis( 3-trimethylsilylcyclopentadienyl) zirconium dimethyl and (1,1,3,3-tetramethyldisiloxanylene)bis (tetrahydroindenyl) zirconium dimethyl.

Similarly, metallocene precursors providing tacticity control exist where (A-Cp) is (Cp) (Cp*), both Cp and Cp* having substituents on the cyclopentadienyl rings of sufficient steric bulk to restrict rotation of the cyclopentadienyl ligands such that the aforementioned symmetry conditions are satisfied. Preferable chiral racemic metallocenes of this type include bis(tricyclo[5.2.1.0$^{2,6}$]deca-2,5-dienyl) zirconium and -hafnium dimethyl, bis((1R)-9,9-dimethyltricyclo[6.1.1.0$^{2,6}$]deca-2,5-dienyl) zirconium dimethyl, bis(tricyclo[5.2.1.0$^{2,6}$]deca-2,5,8-trienyl) zirconium dimethyl, bis(tricyclo[5.2.2.0$^{2,6}$]undeca- 2,5,8-trienyl)zirconium and -hafnium dimethyl and bis ((1R, 8R)-7,7,9,9-tetramethyl [6.1.1.0$^{2,6}$]deca-2,5-dienyl) zirconium and -hafnium dimethyl.

Preferably metallocene precursors for the production of poly-α-olefins having enhanced syndiotactic character are also those of Equation 22 where S and S" are chosen such that the two Cp-ligands have substantially different steric bulk. In order to produce a syndiotactic polymer the pattern of the Groups substituted on the Cp-rings is important. Thus, by steric difference or sterically different as used herein, it is intended to imply a difference between the steric characteristics of the Cp and Cp* rings that renders each to be symmetrical With respect to the A bridging Group but different with respect to each other that controls the approach of each successive monomer unit that is added to the polymer chain. The steric difference between the Cp and Cp* rings act to block the approaching monomer from a random approach such that the monomer is added to the polymer chain in the syndiotactic configuration.

Preferable metallocene precursors for the production of syndiotactic polymers are those of Equation 22 where S and S" are chosen such that 1) the steric difference between the two Cp-ligands is maximized and 2) there remains a plane of symmetry through the metal center and the $C_1$ and $C_1'$ carbon atoms of the Cp-rings in Equation 22. Thus, complexes such as Me$_2$C($\eta^5$-C$_5$H$_4$)(1-fluorenyl)MMe$_2$ (where M=Ti, Zr, or Hf) which possess this symmetry are preferred, and generally produce the syndiotactic polymer with higher degrees of stereoregularity than similar, but less symmetric, systems.

When two transition metal compound based catalysts are used in one reactor as a mixed catalyst system, the two transition metal compounds should be chosen such that the two are compatible or non-reactive to one another. A simple screening method such by $^1$H or $^{13}$C NMR, known to those of ordinary skill in the art, can be used to determine which transition metal compounds are compatible or non-reactive to one another.

It is preferable to use the same activator for the transition metal compounds, however, two different activators, such as a non-coordinating anion activator and an alumoxane, can be used in conjunction. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

Preferred catalysts which produce the higher molecular weight amorphous polypropylenes include those mono-cyclopentadienyl transition metal compounds having symetrical substitutions on the cyclopentadienyl ring as described above. Likewise preferred catalysts that can produce the lower molecular weight isotactic polypropylene are those described in U.S. Pat. No. 5,120,867, which is incorporated by reference herein. Any catalysts, including supported catalysts, which can be used together or in series, that can also produce the desired polypropylene can be utilized in this invention to produce the in situ blend. Preferred catalysts include cyclopentadienyl transition metals compounds and derivatives thereof used in conjunction with an alumoxane and/or a compatible non-coordinating anion.

Particularly preferred combinations of transition metal compounds include:

(1) Me$_2$Si(Me$_4$C$_5$)(N-c-C$_{12}$H$_{23}$)TiCl$_2$ and Me$_2$Si(H$_4$Ind)$_2$ZrCl$_2$ (H$_4$Ind= tetrahydroindenyl)activated with an alumoxane, such as methylalumoxane;

(2) Me$_2$Si(Me$_4$C$_5$)(N-c-C$_{12}$H$_{23}$)TiCl$_2$ and Me$_2$Si(H$_4$Ind)$_2$HfCl$_2$ activated with an alumoxane, such as methylalumoxane;

(3) Me$_2$Si(Me$_4$C$_5$)(N-c-C$_{12}$H$_{23}$)TiCl$_2$ and Me$_2$Si(2-MeInd)$_2$ZrCl$_2$ activated with an alumoxane, such as methylalumoxane;

(4) Me$_2$Si(Me$_4$C$_5$)(N-c-C$_{12}$H$_{23}$)TiCl$_2$ and Me$_2$Si(2-MeInd)$_2$HfCl$_2$ activated with an alumoxane, such as methyl alumoxane;

(5) Me$_2$Si(Me$_4$C$_5$)(N-c-C$_{12}$H$_{23}$)TiMe$_2$ and Me$_2$Si(H$_4$Ind)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron;

(6) Me$_2$Si(Me$_4$C$_5$)(N-c-C$_{12}$H$_{23}$)TiMe$_2$ and Me$_2$Si(H$_4$Ind)$_2$HfMe$_2$ activated with a non-coordinating anion activator, such as N,N-dimethylanilinium tetrakis(pentaflourophenyl)boron or triphenylcarbonium tetrakis(pentaflourophenyl)boron;

(7) Me$_2$Si(Me$_4$C$_5$)(N-c-C$_{12}$H$_{23}$)TiMe$_2$ and Me$_2$Si(2-MeInd)$_2$ZrMe$_2$ activated with a non-coordinating anion activator, such as N,N-dimethylanilinium tetrakis(pentaflourophenyl)boron or triphenylcarbonium tetrakis(pentaflourophenyl)boron; and (8) Me$_2$Si(Me$_4$C$_5$)(N-c-C$_{12}$H$_{23}$)TiMe$_2$ and Me$_2$Si(2-MeInd)$_2$HfMe$_2$ activated with a non-coordinating anion activator, such as N,N-dimethylanilinium tetrakis(pentaflourophenyl)boron or triphenylcarbonium tetrakis(pentaflourophenyl)boron.

The two transition metal compounds may be used in any ratio. Preferred ratios of (A) transition metal compound to produce amorphous polypropylene to (B) transition metal compound to produce crystalline polypropylene fall within the range of (A:B) about 1:10 to about 50:1, preferably about 1:10 to about 10:1, more preferably about 1:1 to about 5:1, even more preferably about 2:1 to about 4:1.

As is well known in the art, the catalysts may also be supported together on one inert support, or the catalysts may be independently placed on two inert supports and subsequently mixed. Of the two methods, the former is preferred.

As an added benefit the in situ blends have properties that are superior even to the physical blend of the isotactic polypropylene and the amorphous polypropylene. See Table 7 below for a comparison. The polymers produced by the in-situ process using mixed cyclopentadienyl transition metal compounds exhibit thermoplastic elastomer type properties, especially strong tensile strengths and high elastic recoveries. The TPE properties of the insitu blends, especially the high temperature elastic recovery properties, are significantly better than that of similar compositions achieved by the physical blends.

In another embodiment this invention relates to physical poly-α-olefin blends comprising amorphous poly-α-olefin and crystalline poly-α-olefin produced by physically blending the two separate polymers.

In a preferred embodiment, in either the in situ or physical blend, the poly-α-olefin is polypropylene, preferably propylene homopolymer or copolymer having a minor amount of olefin comonomer. Examples of crystalline polypropylene include isotactic polypropylene and syndiotactic polypropylene. The blends preferably comprise about 10 to about 90 weight percent of an amorphous polypropylene having an Mw of at least about 150,000 and about 90 to about 10 weight percent, based upon the weight of the polymers, of a crystalline polypropylene having an Mw of less than about 300,000, preferably between about 150,000 and about 20,000, provided that the Mw of the amorphous polypropylene is greater than the Mw of the isotactic polypropylene, preferably by about 40,000 daltons or more, even more preferably by about 70,000 daltons ore more, even more preferably by about 100,000 daltons or more. In a further preferred embodiment the blend comprises about 30 to about 90 weight percent of an amorphous polypropylene and about 70 to 10 weight percent of a crystalline polypropylene. In a particularly preferred embodiment the blend comprises about 50 to about 90 weight percent of an amorphous polypropylene and about 50 to 10 weight percent of a crystalline polypropylene. In particularly preferred embodiments, the crystalline polypropylene is an isotactic polypropylene.

Preferred amorphous polypropylenes that can be used in either the in-situ or physical blend methods in this invention include homopolymers of propylene and copolymers of propylene and up to about 40 weight percent, preferably up to about 20 weight percent, even more preferably up to about 10 weight percent, based upon the weight of the copolymer, of another α-olefin. In a preferred embodiment, small quanities of ethylene may also be added such that the polymer contains no more than 10 wt % ethylene. In addition preferred amorphous polymers have a weight average molecular weight (Mw) of about 150,000 or more, preferably about 150,000 to about 750,000, even more preferably about 150,000 to about 500,000. Preferred amorphous polymers also have low crystallinity, preferably a crystallinity, as measured by carbon 13 NMR using the conditions described in J. Randall, Polymer Sequence Determination, Carbon-13 NMR Method. Academic Press 1977, New York, of about 30% or less of isotactic and syndiotactic pentads combined (rrrr+mmmm), preferably about 20% or less.

In another preferred embodiment the amorphous polymers used or produced in this invention have a narrow molecular weight distribution, (Mw/Mn≦5, preferably≦3, even more preferably≦2.5). In another preferred embodiment the amorphous copolymers used or produced in this invention have a composition distribution breadth index (CDBI) of 40% or more, preferabaly 50% or more, preferably 60% or more, even more preferably 75% or more. High molecular weight amorphous polymers with a narrow Mw/Mn and/or a CDBI of 50% or more can be produced by the methods described in U.S. patent application Ser. No. 07/902,631, filed Jun. 23, 1992, incorporated by reference herein.

In short amorphous poly-α-olefins particularly polypropylene, are produced using mono-cyclopentadienyl transition metal compounds that are symmetrically substituted about the cyclopentadienyl ring, i.e. at the 2, 5 positions and/or the 3, 4 positions, or one substitutent balanced by a bridging Group.

Preferred crystalline propylene polymers useful in this invention include homopolymers of propylene and copolymers of propylene and up to about 40 weight percent of another α-olefin or ethylene, preferably up to about 20 weight percent, based upon the weight of the copolymer. In addition preferred crystalline polymers have a weight average molecular weight (Mw) of about 300,000 or less, preferably 150,000 or less, even more preferably 100,000 or less. Preferred crystalline polymers also have good crystallinity, preferably a crystallinity, as measured by carbon 13 NMR, of about 70% or more isotactic dyads (m) or 70% or more syndiotactic dyads (r), preferably about 80% or more isotactic dyads (m) or 70% or more syndiotactic dyads (r), even more preferably 90% or more isotactic dyads (m) or 70% or more syndiotactic dyads (r).

In another preferred embodiment the crystalline polymers used in this invention have a narrow molecular weight distribution, (Mw/Mn≦5, preferably≦3, even more preferably≦2.5). In another preferred embodiment the crystalline copolymers used in this invention have a composition distribution breadth index (CDBI) of 40% or more, preferably 50% or more, preferably 60% or more, even more preferably 75% or more. Crystalline polymers with a narrow Mw/Mn and/or a CDBI of 50% or more can be produced by the methods described in U.S. Pat. No. 5,120,867, incorporated by reference herein. CDBI is a measure of the uniformity of comonomer distribution within the sample and is measured by the process described in PCT publication WO 9303093, published Feb. 18, 1993, which is incorporated by reference herein.

The physical blends of this invention are preferably produced by conventional blending or compounding techniques known in the art. For example the desired amorphous polypropylene and crystalline polypropylene can be dissolved in hot solvent and then precipitated in acetone, washed with water and dried in vacuum to produce a blend according to this invention.

Preferred compositions comprising both the amorphous polypropylene and the isotactic polypropylene described herein have heat of fusion (also called enthalpy of melting) as measured by DSC (first peak, second melt) of about 50 J/g or less, even more preferably 35 J/g or less. Another desirable feature of preferred compositions comprising both amorphous polypropylene and crystalline polypropylene made herein is that they have a melting point (first peak, second melt) of about 100° C. or more, more preferably about 120° C. or more. In a particularly preferred embodiment these compositions have a Tm between about 130° C. and 160° C. Likewise in a preferred embodiment the compositions described herein have a heat of fusion of 11 J/g or more. The actual value is dependent on the amount of amorphous material present. For example in the data presented below, the composition of isotactic polypropylene alone had an enthalphy of melting of 84.5 J/g, The composition produced by using one amorphous catalyst and one isotactic catalyst together in a one to one ratio had an enthalphy of melting of 33.22 J/g. The composition produced by using one amorphous catalyst and one isotactic catalyst together in a two to one ratio had an enthalphy of melting of 23.43 J/g. The composition produced by using one amorphous catalyst and one isotactic catalyst together in a five to one ratio had an enthalphy of melting of 11.4 J/g.

Process of Polymerization

In accordance with a preferred procedure the selected catalyst system (consisting of a mono-Cp transition metal compound, a bis-Cp transition metal compound and an activator) for the production of an amorphous/crystalline polypropylene blend may be used to produce such blends by solution, slurry or bulk polymerization using the propylene or an inert solvent such as toluene or hexane as the polymerization diluent in which the selected catalyst is dissolved in an amount sufficient to yield the type of polymer blend desired. The most preferred polymerization processes are the solution phase or bulk polymerization processes wherein the reactor is controlled at such a temperature and pressure as to maintain a homogeneous polymer blend in the reactor. Generally the polymerization process is carried out with a pressure of from about 10 to about 1000 psi (68.9 KPa–6890 KPa), most preferably from about 40 to 600 psi (276 KPa–4134 KPa). The polymerization diluent is maintained at a temperature of from about −10° C. to about 160° C., preferably from about 20° C. to about 140° C., and most preferably from about 30° C. to about 120° C. The catalyst systems used by the process of this invention may also be employed in a high temperature/pressure polymerization process. In such, the pressure can be in the range of 5,000–40,000 psi (34–276 MPa) and the temperature in the range of 120°–300° C.

The polymerization may be carried out as a batchwise slurry, solution or bulk polymerization or as a continuous polymerization process. The procedure of continuous polymerization process is preferred, in which event propylene and catalyst are continuously supplied to the reaction zone in amounts equal to the propylene and catalyst removed from the reaction zone with the polymer blend in the product stream. The catalyst system described herein may optionally be placed on a support medium and employed in such polymerization processes as gas phase polymerization.

The monomer for such process may comprise propylene alone for the production of an amorphous/crystalline polypropylene blend. When an alumoxane or aluminum based Lewis acid is used as the activator, the aluminum to transition metal ratio is preferably from about 1:1 to about 2000:1, more preferably from about 1:1 to about 1000:1. When a non-coordinating anion activator is used the activator to transition metal ratio is preferably from about 5:1 to about 1:5, more preferably from 2:1 to 1:1. The reaction time is preferably from about 1 second to 10 hours depending on the exact process used. Additionally, scavenging agents may be employed during polymerization of olefins. Hydrogen may be used to adjust polymer blend molecular weight.

The polyolefin compositions of this invention whether formed in situ or by physical blending are preferably used in any thermoplastic elastomer application. Examples include uses in, inter alia, molded parts, films, tubing, hose, sheeting, wire and cable coating, adhesives, shoesoles, bumpers, gaskets, bellows, films, fibers, elastic fibers, nonwovens, surgical gowns and medical devices. Particularly desirable uses include use in diaper waist bands, use in melt blown fibers of woven and non-woven applications such as diapers and surgical drapes and gowns. Further desired uses include food wrap applications either with the blend alone or in combination with another layer. The products of this invention can also be used in any known thermoplastic elastomer application.

EXAMPLES

Molecular weight (Mw and Mn) were measured by Gel Permeation Chromotography using a Waters 150-CV Gel Permeation Chromatograph equipped with a differential refractive index (DRI) detector and polystyrene standards. Polymer samples were dissolved in trichlorobenzene solvent at 165° C. and the solutions were run at 145° C. using three Shodex GPC AT-80 M/S columns in series. This general technique is discussed in "Liquid Chromotography of Polymers and Related Materials III'" J. Cazes Ed., Marcel Decker, 1981, page 207, which is incorporated by eference herein. No corrections for column spreading were employed; however, data on generally accepted standards, e.g. National Bureau of Standards Polyethylene 1475, demonstrated a precision with 0.1 units for Mw/Mn which was calculated from elution times. The numerical analyses were performed using Expert Ease™ software available from Waters Corporation.

The melting temperature (Tm, first peak, second melt) of the polymer is measured by using Dupont Instruments 912 differiential scanning calorimeter (DSC) or a DuPont DSC 9900 each of which is equipped with the standard numerical analysis software. The area under the melting peak represents the enthalpy of melting (or heat of fusion) and is reported in Joules per grams(J/g). Standard procedure involved equilibrating the sample at 0° C., increasing the temperature at a rate of 10° C./min to 200° C. (first melt); remaining at 200° C. for 2 min; decreasing the temperature at a rate of 10° C./min to 0° C. (crystallization temperature); remaining at 0° C. for 2 min; and increasing the temperature at a rate of 10° C./min to 20° C. (second melt). Typical crystallization and second melt plots were recorded between 0° and 180° C.

Tensile, elongation, yield stress and modulus were measure according to ASTM D 412 on an Instron Tensile Tester.

Percent elastic recovery was determined according to the following equation: % recovery=[(2Lo-L')/Lo]× 100; wherein Lo=original length of the sample, L' is the length of the sample after being held at 200% elongation for 10 minutes and then released and allowed to relax for 10 minutes at room temperature.

Transition metal compounds were prepared as described in 08/159,5,264,405 and 5,120,867. Non-coordinating anions were prepared as described in U.S. Pat. No. 5,120, 867. Methylalumoxane (10 wt % in toluene) was purchased from Ethyl Corporation, (now Albemarle.) $Me_2Si(IND)_2HfMe_2$ was made according to the procedures described in U.S. Ser. No. 08/159,888.

Example A: Physical Blend

Isotactic polypropylene (iPP) and amorphous polypropylene (aPP) were blended in solution in the ratios shown in Table 1. Desired amounts of each component were dissolved together in hot toluene, precipitated in acetone, washed with water and finally dried in a vacuum oven. The individual components were prepared as follows:

The amorphous polypropylene used in this study (in both Tables 1 and 3) was synthesized by using a catalyst system of alumoxane in combination with $Me_2Si(Me_4C_5)(N$-c-$C_{12}H_{23})TiCl_2$. The synthesis was done in a 1-liter zipperclave reactor. At room temperature, 400 ml of propylene was charged into the reactor with 2.0 ml of a ten weight percent solution of methylalumoxane (MAO) in toluene subsequently added as a scavenger. The temperature was then increased to 40° C. A preactivated catalyst solution of $Me_2Si(Me_4C_5)(N$-c-$C_{12}H_{23})TiCl_2$ ($2.09\times10^{-3}$ mmol) and 2 ml of a ten weight percent solution of methylalumoxane (MAO) in toluene was then pressurized into the reactor via high pressure nitrogen. The reaction was run for 60 minutes prior to venting and cooling and yielded 125.7 g of rubbery polymer once dried. The resulting product had no detectable melting temperature as determined by DSC. The molecular weight as measured by GPC was Mn= 287,800 and Mw/Mn was 2.91.

Isotactic polypropylene (iPP[1]) was synthesized following the general procedure described above. In a one liter Zipperclave reactor at room temperature, 400 ml of toluene were charged into the reactor. In a separate vial, 50 mg of dimethylsilyl bis(indenyl)hafnium dimethyl and 80 mg of N,N-dimethylanilinium tetrakis(pentaflourophenyl)boron were mixed with 3 ml of toluene. This solution was then pressurized into the reactor via cannula and high pressure nitrogen. Liquid propylene (100 ml) was then charged into the reactor, the temperature was raised to 40° C. and allowed to react for 10 minutes. The reactor was vented and cooled. The final solution was precipitated in acetone and vacuum dried. Yield was 50 g. This polymer is referred to as iPP[1]. Melting point of the polymer product was 136.9° C., the Mn was 159,200, and the Mw/Mn was 1.98.

The blends of the amorphous polypropylene made above and iPP[1] are reported in Table 1. Table 2 summarizes the crystalline melting temperatures ($T_m$ in °C., second melt) and the heats of fusion ($H_f$ in J/g) for these blends, as measured by DSC. The amorphous polypropylene was also blended with commercially available isotactic polypropylene(iPP[2]) having the characteristics of an Mn of about 49,100 and Mw/Mn of 5.5. Blends of amorphous polypropylene and iPP[2] are reported in Table 3. Such iPP[2] is commercially available as ESCORENE™ PP1042 Polymer from Exxon Chemical Company.

The various blends and their physical properties are reported in Tables 1, 2, 3 and 4.

TABLE 1

| | iPP/aPP Blend | | | | |
|---|---|---|---|---|---|
| iPP (wt %) | 0 | 10 | 20 | 40 | 60 |
| aPP (wt %) | 100 | 90 | 80 | 60 | 40 |
| Tensile (psi/MPa) | | | | | |
| 25° C. | 551/4 | 968/7 | 1631/11 | 2289/17 | 3778/26 |
| 50° C. | — | 180/1 | 429/3 | 1145/8 | 2053/14 |
| 75° C. | — | 118/.8 | 211/1.4 | 568/4 | 1357/9 |
| Elongation (%) | | | | | |
| 25° C. | 790 | 1019 | 1018 | 740 | 781 |
| 50° C. | — | 2665 | 1895 | 1053 | 922 |
| 75° C. | — | ND | 1029 | 815 | 938 |
| Modulus (psi/MPa) | | | | | |
| 25° C. | 270/1.8 | 254/1.7 | 464/3 | ND | 9480/65 |
| 50° C. | — | 380/2.6 | 651/4.5 | 3083/21 | 6554/45 |
| 75° C. | — | ND | 643/4.4 | 2035/14 | 4981/34 |
| Elastic Recovery (%) | | | | | |
| 25° C. | 100 | 95.3 | 94.1 | 82.4 | 13.9 |
| 50° C. | — | 84.2 | 75.1 | 70.8 | 6.3 |
| 75° C. | — | ND | 58.8 | 6.5 | 0 |

ND = Not Determined

TABLE 2

| iPP[1] (wt %) | $T_m$ (°C.) | $H_f$ (J/g) |
|---|---|---|
| 10 | 132.2 | 6.7 |
| 20 | 133.8 | 10.7 |
| 40 | 134.5 | 20.2 |
| 60 | 136.6 | 40.5 |
| 100 | 136.9 | 68.4 |

TABLE 3

| | iPP/aPP Blend | | | | |
|---|---|---|---|---|---|
| iPP[2] (wt %) | 0 | 10 | 20 | 30 | 40 |
| aPP (wt %) | 100 | 90 | 80 | 70 | 60 |
| Tensile (psi/MPa) | | | | | |
| 25° C. | 551/3.8 | 912/6.3 | 1321/9 | 2391/16 | 2986/21 |
| 50° C. | — | 187/1.3 | 301/2.1 | 548/3.8 | 716/5 |
| 75° C. | — | 138/1 | 212/1.4 | 343/2.4 | 407/3 |
| Elongation (%) | | | | | |
| 25° C. | 790 | 933 | 829 | 823 | 834 |
| 50° C. | — | 784 | 1457 | 1065 | 788 |
| 75° C. | — | 209 | 372 | 440 | 349 |
| Modulus (psi/MPa) | | | | | |
| 25° C. | 270/1.9 | 257/1.7 | 496/3.4 | 1099/8 | 1409/9.7 |
| 50° C. | — | 496/3.4 | 955/6.5 | 1943/13 | 3556/25 |
| Elastic Re- | | | | | |

TABLE 3-continued

| iPP/aPP Blend | | | | | |
|---|---|---|---|---|---|
| covery (%) | | | | | |
| 25° C. | 100 | 93.7 | 90.8 | 85 | 77.1 |
| 50° C. | — | 81.4 | 76.8 | 35.1 | 25.0 |
| 75° C. | — | ND | 62.6 | 33.1 | 27.8 |

ND = Not Determined

TABLE 4

| iPP[2] (wt %) | $T_m$ (°C.) | $H_f$ (J/g) |
|---|---|---|
| 10 | 157 | 6.5 |
| 100 | 163 | 79.8 |

Example B: In Situ Blends
Example 1.

The polymerization run was performed in a 1-liter autoclave reactor equipped with a paddle stirrer, an external water jacket for temperature control, a regulated supply of dry nitrogen, ethylene, propylene and hexane, and a septum inlet for introduction of other solvents or comonomers, transition metal compound and alumoxane solutions. The reactor was dried and degassed thoroughly prior to use. A typical run consisted of injecting 400 ml of propylene and 2 ml of 10 wt % MAO into the reactor, and heating it to 40° C. A solution (1.0 ml) containing $Me_2Si(Me_4C_5)(N\text{-}c\text{-}C_{12}H_{23})TiCl_2$ (13.4 mg) dissolved in 10 ml of toluene was then added to the reactor. The reactor was maintained at 40° C. during the 15 minute polymerization. The reaction was ceased by rapidly cooling and venting the system and the catalyst was killed by thoroughly exposing to product to air. The solvent was evaporated off of the polymer by a stream of nitrogen and if needed, the sample was further dried by vacuum. Polypropylene was recovered (64.9 g, Mw= 1,824,000, MWD=1.767, m=0.443, mmmm=0.037, r= 0.557, rrrr= 0.062).

Example 2.

Using the same reactor design and general procedure already described, 400 ml of propylene and 2 ml of 10 wt % MAO were added to the reactor. The reactor was heated to 40° C. prior to introduction of 1.0 ml of a 10 ml toluene solution containing $Me_2Si(Me_4C_5)(N\text{-}c\text{-}C_{12}H_{23})TiCl_2$ (17.0 mg) and $Me_2Si(H_4Ind)_2ZrCl_2$ (3.2 mg)(Ind=indenyl). The reactor was maintained at 40° C. during the 10 minute polymerization. The reaction was ceased by rapidly cooling and venting the system and the catalyst was killed by thoroughly exposing to product to air. The solvent was evaporated off of the polymer by a stream of nitrogen and if needed, the sample was further dried by vacuum. Polypropylene was recovered (63.6 g, Mw= 1,282,000, MWD=6.17 (bimodal), m=0.508, mmmm= 0.142, r=0.493, rrrr=0.064).

Example 3.

Using the same reactor design and general procedure already described, 400 ml of propylene and 2 ml of 10 wt % MAO were added to the reactor. The reactor was heated to 40° C. prior to introduction of 1.0 ml of a 10 ml toluene solution containing $Me_2Si(Me_4C_5)(N\text{-}c\text{-}C_{12}H_{23})TiCl_2$ (9.0 mg) and $Me_2Si(H_4Ind)_2ZrCl_2$ (4.3 mg). The reactor was maintained at 40° C. during the 15 minute polymerization. The reaction was ceased by rapidly cooling and venting the system and the catalyst was killed by thoroughly exposing to product to air. The solvent was evaporated off of the polymer by a stream of nitrogen and if needed, the sample was further dried by vacuum. Polypropylene was recovered (69.8 g, Mw= 914,000, MWD=12.6 (bimodal), m=0.577, mmmm= 0.267, r=0.423, rrrr=0.073).

Example 4.

Using the same reactor design and general procedure already described, 400 ml of propylene and 2 ml of 10 wt % MAO were added to the reactor. The reactor was heated to 40° C. prior to introduction of 1.0 ml of a 10 ml toluene solution containing $Me_2Si(Me_4C_5)(N\text{-}c\text{-}C_{12}H_{23})TiCl_2$ (6.8 mg) and $Me_2Si(H_4Ind)_2ZrCl_2$ (6.5 mg). The reactor was maintained at 40° C. during the 15 minute polymerization. The reaction was ceased by rapidly cooling and venting the system and the catalyst was killed by thoroughly exposing to product to air. The solvent was evaporated off of the polymer by a stream of nitrogen and if needed, the sample was further dried by vacuum. Polypropylene was recovered (71.6 g, Mw= 742,000, MWD=22.3 (bimodal), m=0.638, mmmm= 0.353, r=0.362, rrrr=0.049).

The proportions of the catalysts and the product data are reported in the tables below. The in situ polymer products had bimodal molecular weight distributions (Mw/Mn). They typically had a lower peak at $5 \times 10^4$ daltons corresponding to the pure isotactic polypropylene and a higher Mw peak at $1.8 \times 10^6$ daltons corresponding to the amorphous polypropylene. The GPC molecular weight distribution curves of examples 2, 3 and 4 from table 5 are presented in FIG. 1.

TABLE 5

| Ex. | wt % Zr cat. | wt % Ti cat. | wt %* iPP in product | Tm (°C.) | MW (daltons) |
|---|---|---|---|---|---|
| 1 | 0 | 100 | 0 | amorphous | $1.8 \times 10^6$ |
| 2 | 16.7 | 83.3 | 12 | 143.6 | bimodal $1.8 \times 10^6$ $5.6 \times 10^4$ |
| 3 | 33.3 | 66.7 | 40 | 146.1 | bimodal $1.9 \times 10^6$ $5.7 \times 10^4$ |
| 4 | 50.0 | 50.0 | 52 | 146.6 | bimodal $1.8 \times 10^6$ $5.7 \times 10^4$ |

*wt % was calculated from the heat of fusion as measured by DSC.

TABLE 6

| Property | Polymer from Example 1 | Polymer from Example 2 | Polymer from Example 3 | Polymer from Example 4 |
|---|---|---|---|---|
| Tensile (psi/MPa) | | | | |
| 25° C. | nd | 1100/7.5 | 1600/11.0 | 2200/15.1 |
| 50° C. | 220/1.5 | 210/1.4 | 910/6.2 | 1000/6.8 |
| 75° C. | 120/0.8 | 120/0.8 | 210/1.4 | 320/2.2 |
| 90° C. | @ | @ | 200/1.3 | 240/1.6 |
| Elongation (%) | | | | |
| 25° C. | nd | 970 | 900 | 930 |
| 50° C. | 1500 | 1000 | 1900 | 1800 |
| 75° C. | 350 | nd | 360 | 820 |
| 90° C. | @ | @ | 190 | 240 |
| Modulus (psi/MPa) | | | | |
| 25° C. | nd | 330/2.2 | 960/6.6 | 1700/11.7 |
| 50° C. | 250/1.7 | 490/3.3 | 1200/8.2 | 2700/18.6 |
| 75° C. | nd | nd | nd | 1700/11.7 |
| 90° C. | @ | @ | nd | nd |
| Elas Rec. (%) | | | | |
| 25° C. | 97 | 97 | 94 | 88 |

TABLE 6-continued

| Property | Polymer from Example 1 | Polymer from Example 2 | Polymer from Example 3 | Polymer from Example 4 |
|---|---|---|---|---|
| 50° C. | nd | nd | 83 | 81 |
| 75° C. | nd | nd | 83 | 74 |
| 90° C. | @ | @ | @ | @ |

@ Sample broke during testing.

It has been found that by blending isotactic polypropylene and amorphous polypropylene together or producing the blend in-situ, we obtained products with greatly improved mechanical strength that also have good rubber recovery properties. For example, by blending 10 wt % of isotactic polypropylene with 90 wt % of amorphous polypropylene together, we obtained a product with 970 psi(6.7 MPa) tensile strength and 95% rubber recovery compared to 550 psi (3.8 MPa) tensile strength and 100% rubber recovery of the pure amorphous polypropylene. As we increased isotactic polypropylene component to 20 wt %, the tensile strength increased to 1630 psi (11.2 MPa) while the rubber recovery was maintained at 94%. At 40 wt % isotactic polypropylene, the tensile strength further increased to 2290 psi (15.8 MPa) while good rubber recovery of 82% was maintained. Furthermore, DSC characterization revealed that the amorphous polypropylene/isotactic polypropylene blends still retained high crystalline melting points close to the pure isotactic polypropylene (see Tables 2 and 4 above).

In addition we also found that the in situ blends of isotactic polypropylene and amorphous polypropylene have properties superior to comparable physical blends, especially at higher temperatures. Thus we have found a one step method to produce a desirable thermoplastic elastomer. Table 7 compares Example 3 in Table 6 to 40–60/iPP-amorphous polypropylene blend in Table 3.

TABLE 7

| Property | In Situ Blend Table 5, Example 3 | Physical Blend Table 3 40/60 blend (iPP/aPP) |
|---|---|---|
| Tensile (psi/MPa) | | |
| 25°C. | 1600/11.0 | 2986/20.5 |
| 50°C. | 910/6.2 | 716/4.9 |
| 75°C. | 210/1.4 | 407/2.8 |
| Elongation (%) | | |
| 25°C. | 900 | 834 |
| 50°C. | 1900 | 788 |
| 75°C. | 360 | 349 |
| Elastic Recovery (%) | | |
| 25°C. | 94 | 77 |
| 50°C. | 83 | 25 |
| 75°C. | 83 | 28 |

Example 5.

Using the same reactor design and general procedure already described, 400 ml of hexane and 2 ml of a triisobutyl aluminum scavenger solution (0.1 ml of 25 wt % of triisobutyl aluminum in 2 ml of toluene) were charged into the one liter Zipperclave reactor. After heating to 40° C. a mixed catalyst solution (1 ml of Solution A and 1.5 ml of Solution B) was cannulated into the reactor. Solution A is 7.49 mg of $Me_2Si(Ind)_2HfMe_2$ and 12.01 mg of N,N-dimethylaniliniumtetrakis(pentafluorophenyl)borate (DMAH) in 10 ml toluene. Solution B is 13.12 mg of $Me_2Si(Me_4C_5)(N\text{-}c\text{-}C_{12}H_{23})TiMe_2$ and 24.02 mg of DMAH in ml of toluene. The reactor was heated to 60° C. and 50 ml of liquid polypropylene was charged into the reactor and allowed to polymerize for 30 minutes. The reaction was ceased by rapidly cooling and venting the system and the catalyst was killed by thoroughly exposing to product to air. The solution was precipitated in acetone and dried in a vacuum oven. Polypropylene was recovered (18.69 g, Tm=133° C. (first melt) Mw=208,000, Mn=113,000 MWD=1.84). This example was repeated twice, each time the catalyst ratio was altered. The data are presented in Table 8.

TABLE 8

| | Ex. 5-1 | Ex. 5-2 | Ex. 5-3 |
|---|---|---|---|
| Catalyst molar ratio (B:A) | 3:1 | 2:1 | 4:1 |
| Mw | 208,000 | 203,000 | 227,000 |
| Mn | 113,000 | 111,000 | 129,000 |
| Elastic Recovery at 25° C.* | 95% | 75% | 100% |

*sample tested 10 minutes after stress was removed.

Example 6.

Polymerization was then conducted in a five gallon reactor as follows. Two catalyst solutions were prepared. Solution C was prepared by combining 28.44 mg of $Me_2Si(Ind)_2HfMe_2$ with 49.72 mg of DMAH in 5 ml of toluene and thereafter diluting to a total volume of 40 ml with toluene. Solution D was prepared by combining 74.43 mg of $Me_2Si(Me_4C_5)(N\text{-}c\text{-}C_{12}H_{23})TiMe_2$ and 130.64 mg of DMAH in 5 ml of toluene and therefter diluting to a total volume of 60 ml with toluene. Solution C was then combined with solution D, for a total volume of 100 ml, and thereafter placed in a stainless steel cylinder. The five gallon reactor was cleaned throughly with toluene followed by hexane, purged with nitrogen and dried at 100° C. for at least an hour. Hexane (22.4 lbs, 10.17 kg) was then added to the reactor with 34 g of triisobutylaluminum scavenger (prepared as in example 5). The reactor was stirred for two minutes then heated to 60° C. 2.17 pounds (0.99 kg) of liquid propylene were then charged into the reactor with 25 ml of the catalyst solution. The rest of the catalyst solution was added in 25 ml quantities at 5 minute intervals. The polymerization was allowed to run for one hour after the last catalyst addition. The solution was then discharged into a stripping tank half-filled with water and stripped at 70° C. for four hours. The reaction was repeated 8 more times. The data are presented in Tables 9 & 10.

TABLE 9

| Ex. | Yield (lbs/kg) | Tm (2nd melt) (°C.) | Hf (J/g) | Mw (k) | Wt % iPP | Mn (k) |
|---|---|---|---|---|---|---|
| 6-1 | 0.5/0.23 | 133 | 46 | 117 | 68 | 60 |
| 6-2 | 0.7/0.32 | 133 | 31 | 156 | 46 | 87 |
| 6-3 | 3.3/1.50 | 133 | 17 | 174 | 25 | 89 |
| 6-4 | 1.9/0.86 | 134 | 14 | 160 | 21 | 86 |
| 6-5 | 2.0/0.91 | 134 | 14 | 155 | 21 | 81 |
| 6-6 | 1.9/0.86 | 133 | 12 | 158 | 18 | 77 |
| 6-7 | 2.0/0.91 | 134 | 25 | 164 | 37 | 91 |
| 6-8 | 1.6/0.73 | 134 | 14 | 166 | 21 | 93 |
| 6-9 | 1.7/0.77 | 135 | 12 | 166 | 18 | 93 |

*wt % iPP calculated based on DSC heat of fusion.

TABLE 10

| Ex. | Yield stress (psi/MPa) | Modulus (psi/MPa) | Tensile (psi/MPa) | Elong. (%) | Elas. Rec. (%) |
|---|---|---|---|---|---|
| 6-3 | 300/2.0 | 620/4.2 | 740/5.1 | 2060 | 85 |
| 6-4 | 301/2.0 | 620/4.2 | 740/5.1 | 2060 | 85 |
| 6-5 | 320/2.2 | 710/4.8 | 820/5.6 | 1860 | 76 |
| 6-6 | 290/1.9 | 590/4.0 | 615/6150 | 1850 | 74 |
| 6-7 | 330/2.2 | 780/5.3 | 805/5.5 | 1750 | 72 |
| 6-8 | 294/2.0 | 600/4.1 | 770/5.3 | 2130 | 84 |
| 6-9 | 320/2.2 | 770/5.3 | 820/5.6 | 1870 | 90 |

Comparative Example 7.

The procedure and reaction conditions of example 5 were repeated. Instead of charging a mixed metallocene, only 2 ml of solution A were used. At the end of the polymerization, we obtained 14.45 g of isotactic polypropylene with an Mw of 68,000; Mn of 30,000, Mw/Mn of 2.27 and Tm 126° C. and a heat of fusion of 68 J/g.

Comparative Example 8.

The procedure and reaction conditions of example 5 were repeated. Instead of charging a mixed metallocene, only 1 ml of solution B were used. At the end of the polymerization, we obtained 5.4 g of amorphous polypropylene with an Mw of 453,000; Mn of 254,000, Mw/Mn of 1.78 and no detectable melting point.

The compositions described above can be used in many important applications such as elastic films, melt blown elastic fibers, woven articles and non-woven articles. For example diaper waist bands can be produced using the elastic films that can be produced using the blends of this invention. Additionally, the described blends will be also useful in traditional TPE applications such as hose, tubing, sheeting, wire and cable, adhesive, shoe soles, automotive bumpers, window gaskets, bellows, and medical devices.

All references described above, including test methods and priority documents, are incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A process for producing a polypropylene composition comprising:

selecting a first catalyst system comprising an activator and a monocyclopentadienyl transition metal compound capable of producing an amorphous polypropylene having a Mw of at least 150,000 and a Mw/Mn of less than 3;

selecting a second catalyst system comprising an activator and another bis-cyclopentadienyl transition metal compound capable of producing a crystalline polypropylene having a Mw of less than 300,000 and a Mw/Mn of less than 3;

provided that the first and second catalyst systems are selected such that the Mw of the amorphous polypropylene is greater than the Mw of the crystalline polypropylene; and contacting the first and second catalyst systems under polymerization conditions in a polymerization reactor with olefin monomers consisting essentially of propylene to produce a polypropylene composition comprising higher Mw amorphous polypropylene having a Mw of at least 150,000 and a Mw/Mn of less than 3 and lower Mw crystalline polypropylene having a Mw of less than 300,000 and a Mw/Mn of less than 3.

2. The process of claim 1, wherein the first catalyst system comprises a symmetrically substituted mono-cyclopentadienyl transition metal compound used in combination with an alumoxane or a compatible, non-coordinating anion activator; and the second catalyst system comprises a bridged bis-cyclopentadienyl transition metal compound used in combination with an alumoxane or a compatible, non-coordinating anion activator.

3. The process of claim 1 wherein the transition metal compound of the first catalyst system is represented by the formula:

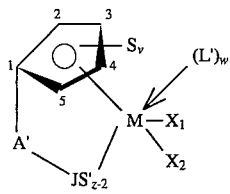

where A' is a bridging Group; $(JS'_{z-2})$ is a heteroatom ligand in which J is an element from Group 15 of the Periodic Table of Elements with a coordination number of 3 or an element from Group 16 with a coordination number of 2, S' is a radical Group which is a hydrocarbyl, substituted hydrocarbyl, halocarbyl, substituted halocarbyl, hydrocarbyl-substituted organometalloid, or halocarbyl-substituted organometalloid; and z is the coordination number of the element J; L' is an olefin, diolefin, aryne, amine, phosphine, ether, or sulfide ligand, or any other neutral Lewis base; $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators which are capable of donating an $X_1$ ligand to the transition metal component are used, $X_1$ and $X_2$ may independently be a halogen, alkoxide, aryloxide, amide, phosphide or other univalent anionic ligand or both; or $X_1$ and $X_2$ can also be joined to form a anionic chelating ligand provided that $X_1$ and $X_2$ are not a substituted or unsubstituted cyclopentadienyl ring; z is the coordination number of the element J; w is an integer from 0 to 3; M is titanium; $S_v$ is a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical where the subscript "v" denotes the carbon atom on the cyclopentadienyl ring to which the substituent is bonded and where there can be zero, two or four substituents, S, on the cyclopentadienyl ring, provided that the cyclopentadienyl ring is symmetrically substituted in the 2 and 5 positions and/or 3 and 4 positions with S groups that are within 2 carbons of each other.

4. The process of claim 1 wherein the second catalyst system is represented by the formula:

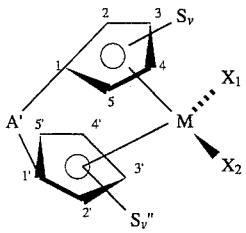

wherein M is Ti, Zr or Hf; "v" denotes the carbon atom on the Cp-ring to which the substituent is bonded; each substituent Group S or S" is, independently, a radical group which is hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals;

A' is a bridging Group;

$X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators which are capable of donating an $X_1$ ligand to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

5. The process of claim 1 wherein the first and second catalyst systems comprise one of the following combinations:

(1) $Me_2Si(Me_4C_5)(N$-c-$C_{12}H_{23})TiCl_2$ and $Me_2Si(H_4Ind)_2ZrCl_2$ activated with an alumoxane;

(2) $Me_2Si(Me_4C_5)(N$-c-$C_{12}H_{23})TiCl_2$ and $Me_2Si(H_4Ind)_2HfCl_2$ activated with an alumoxane;

(3) $Me_2Si(Me_4C_5)(N$-c-$C_{12}H_{23})TiCl_2$ and $Me_2Si(2$-MeInd$)_2ZrCl_2$ activated with an alumoxane;

(4) $Me_2Si(Me_4C_5)(N$-c-$C_{12}H_{23})TiCl_2$ and $Me_2Si(2$-MeInd$)_2HfCl_2$ activated with an alumoxane; or (5) $Me_2Si(Me_4C_5)(N$-c-$C_{12}H_{23})TiCl_2$ and $Me_2C(C_5H_4)($1-fluorenyl$)ZrCl_2$ activated with an alumoxane.

6. The process of claim 5 wherein the alumoxane is methlyalumoxane.

7. The process of claim 1 wherein the first and second catalyst systems comprise one of the following combinations:

(1) $Me_2Si(Me_4C_5)(N$-c-$C_{12}H_{23})TiMe_2$ and $Me_2Si(H_4Ind)_2ZrMe_2$ activated with a non-coordinating anion activator;

(2) $Me_2Si(Me_4C_5)(N$-c-$C_{12}H_{23})TiMe_2$ and $Me_2Si(H_4Ind)_2HfMe_2$ activated with a non-coordinating anion activator;

(3) $Me_2Si(Me_4C_5)(N$-c-$C_{12}H_{23})TiMe_2$ and $Me_2Si(2$-MeInd$)_2ZrMe_2$ activated with a non-coordinating anion activator;

(4) $Me_2Si(Me_4C_5)(N$-c-$C_{12}H_{23})TiMe_2$ and $Me_2Si(2$-MeInd$)_2HfMe_2$ activated with a non-coordinating anion activator; or (5) $Me_2Si(Me_4C_5)(N$-c-$C_{12}H_{23})TiMe_2$ and $Me_2C(C_5H_4)($1-fluorenyl$)ZrMe_2$ activated with a non-coordinating anion activator.

8. The process of claim 6 wherein the non-coordinating anion activator is N,N-dimethylanilinium tetrakis(pentaflourophenyl)boron or triphenylcarbonium tetrakis(pentaflourophenyl)boron.

9. The process of claim 1 wherein the amorphous polypropylene is a copolymer of propylene and another α-olefin.

10. The process of claim 1 wherein the crystalline polypropylene is a copolymer of propylene and another α-olefin.

11. The process of claim 1 wherein the transition metal compound of the first catalyst system is present at one to ten times the amount of the transition metal compound of the second catalyst system.

12. The process of claim 1 wherein the transition metal compound of the first catalyst system is present at about two to about four times the amount of the transition metal compound of the second catalyst system.

* * * * *